H. N. GARSON.
SPRING SUSPENSION FOR MOTOR VEHICLES AND THE LIKE.
APPLICATION FILED MAY 8, 1920.
1,412,733.  Patented Apr. 11, 1922.
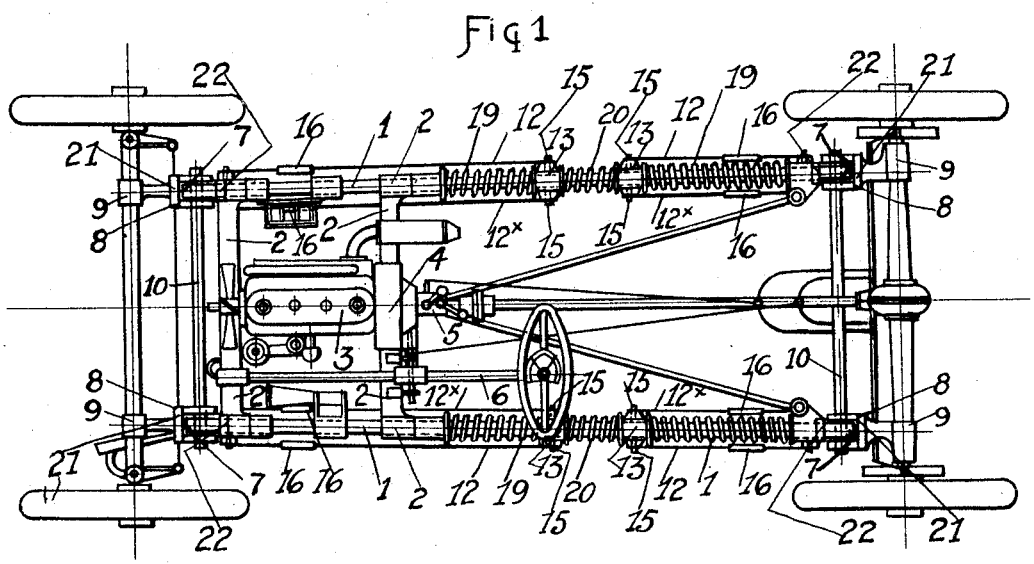
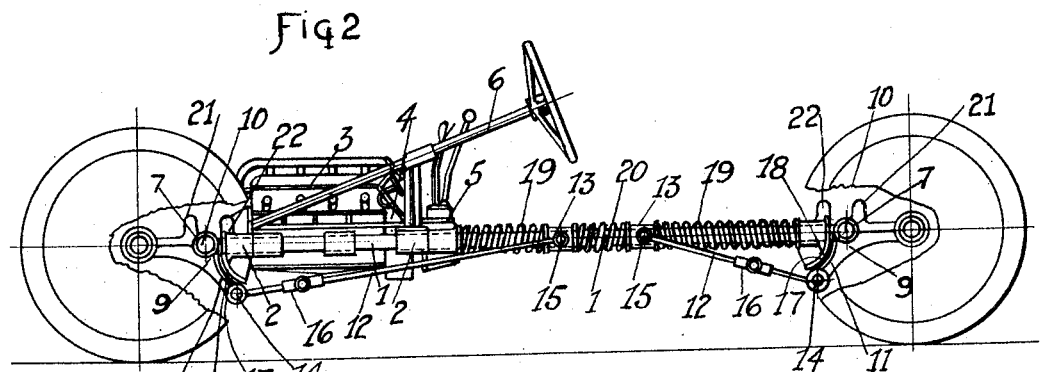
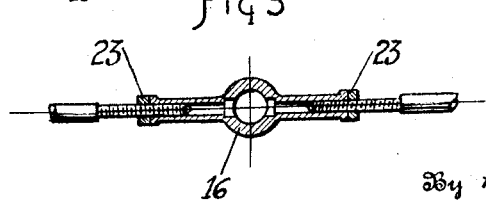

UNITED STATES PATENT OFFICE.

HENRIK N. GARSON, OF NEW YORK, N. Y.

SPRING SUSPENSION FOR MOTOR VEHICLES AND THE LIKE.

1,412,733.   Specification of Letters Patent.   Patented Apr. 11, 1922.

Application filed May 8, 1920. Serial No. 379,799.

*To all whom it may concern:*

Be it known that I, HENRIK N. GARSON, a subject of Norway, residing in the city of New York, county and State of New York, and whose post-office address is 30 Church Street, New York city, N. Y., have invented certain new and useful Improvements in Spring Suspensions for Motor Vehicles and the like, of which the following is a full, clear, and exact specification.

My improvements, although more particularly applicable to motor vehicles, and specifically vehicles for passenger service, may be applied to any wheeled carriage. The object of my invention is to provide a spring suspension which will so absorb shock impulses transmitted by the passage of the wheels over irregularities in the road surface, that the movement of the chassis in response to such shock impulses will be reduced to a minimum; and a further object of my invention is to provide a spring suspension of this type which will permit the mounting of the chassis at a very low point relative to the axial points of the wheels, thus lowering its centre of gravity beyond that permitted by the forms of spring suspension now in use; a further object of my invention is to reduce "side sway" of the chassis and body.

The invention will be understood by reference to the accompanying drawing, illustrating an embodiment thereof, in which—

Fig. 1, is a plan view, somewhat diagrammatic, showing a chassis equipped with a preferred form of my improvements; and Fig. 2, is a side elevation of the same.

Fig. 3, is a sectional detail view of means for adjusting the tension of the springs which act as suspension members for the carriage.

In the embodiment of the invention illustrated in the drawings the chassis comprises the tubular longitudinal frame members 1, and the transverse frame members 2, upon the latter members being mounted the engine 3, and the clutch and transmission members 4, 5, respectively, steering apparatus being illustrated at 6. The longitudinal frame members 1 at each end have secured thereto an apertured bearing member 7, which is embraced by the apertured yoke 8 of a rocker 9. A rod 10 at each end of the longitudinal frame members 1 pivotally connects the two rockers 9, at that end of the chassis, to the appropriate bearing members.

Each rocker is formed with a depending extension 11 which is connected by means of two adjustable links 12, 12˟ with a sleeve 13 slidably movable upon the appropriate longitudinal frame member 1. Although I have shown two links for each rocker to avoid throwing an eccentric stress upon the sleeve, it will be understood that a single link will suffice. Each link comprises two sections, one section being pivotally connected at 14 to the rocker and the second section being pivotally connected at 15 to the sleeve, and the two link-sections are reversely threaded in a turn-buckle 16 which serves as the adjusting member. Each rocker is also formed with a contact surface 17 to co-act with the similarly formed face of a stop-member 18 secured upon the appropriate longitudinal frame member, as illustrated in Fig. 2. The purpose of this latter construction will hereinafter be set forth in detail.

Intermediate each sleeve 13 and a rear stop member, is a helical spring 19 surrounding the appropriate longitudinal frame member; and intermediate the two sleeves on each side of the chassis and likewise surrounding the longitudinal frame member is a spring 20.

In the operation of the device, it will be understood that the springs 19 will be so proportioned to the weight of the chassis and the load supported thereby that the springs will act through the sleeves 13 and links 12 upon the rockers 9 to maintain the latter in the position illustrated in Fig. 2 when the chassis is at rest and the carriage is free from its normal load. In this position, the face 17 of the rocker (which in practice will be covered with leather, fabric or the like) will rest against the opposed face of the stop member 18. The springs preferably will be so proportioned that when the normal load is added to the weight of the chassis, the depending extensions 11 of the rocker will swing outwardly to substantially vertical position, so that the wheel may have a limited descent and rise under the inequalities of the road surface without causing surfaces 17 and 18 of the rocker and its stop member to come in harsh contact. If the load is increased to any great extent above normal, then adjustment of the links by means of the turn-buckles 16 will increase the compression of the springs to secure the desired relative positions of the rockers and stop members. Now, when the chassis is set in motion and a wheel passes over an obstruction and is elevated, its rocker pivotally moves on rod 10 against the compression of the appropriate helical spring 19, and the resultant shock is thus thrown longitudinally of the chassis, instead of vertically as in the forms of spring suspension now in use. When the force which thus swings the rocker against the compression of the spring is dissipated and the rocker is swung back into normal position by the movement of sleeve 13 the latter will be controlled against undue movement by spring 20, the latter acting as a shock absorber and preventing any sudden and harsh contact between the contacting faces of the rocker and stop member 18.

It will be noted that the lock nuts 23 are provided for the turn-buckle 18, so that when the links 12 and 12ˣ are adjusted they will be held in such adjusted position. Each rocker is provided with an upwardly projecting extension or arm 21 which, when the wheel carried by the rocker is moved upwardly swings inwardly towards a stop 22, and hence the arm in conjunction with the stop limits the upward movement of the wheel, and the rocker is prevented from turning an excessive distance upon the breakage of a spring 19 or a link 12.

While I have shown spiral springs in the embodiment of the invention illustrated in the drawing, it will be understood that leaf springs may be arranged on the chassis for the same purpose. It will also be understood that the two links on each side of the chassis may cross each other and be connected to sleeves which engage a single spring disposed between them, with exactly the same result as in the said embodiment. These and various other modifications within the spirit of the invention I contemplate in the claims forming part hereof.

What I claim is:

1. In a motor driven carriage, a frame comprising front and rear transverse members, front and rear axles, rockers serving to connect the axles to the frame, and spring connections between the frame and the rockers for suspending the frame relatively to the axles, said frame including longitudinal members serving to guide the springs and acting as tie members for connecting the front and rear transverse frame members.

2. In a motor-driven carriage, a frame, four wheels through which the carriage is supported upon a road surface, a rocker pivotally connecting each wheel and the frame, a set of two springs carried by the frame at each longitudinal side of the latter, links connecting each set of springs with the rockers, and a bumper spring disposed intermediate the said links at their points of connection with the said springs.

3. In a device of the character described, including a frame, a wheel, and a rocker pivotally connecting the wheel and the frame, an unyielding stop device on the frame, and a second unyielding stop device on the rocker adapted for positive contact with the first mentioned stop device, whereby the swinging movement of the rocker is limited.

Signed at New York, in the county of New York and State of New York, this 29 day of April, A. D. 1920.

HENRIK N. GARSON.